(12) United States Patent
Ikeda

(10) Patent No.: US 10,055,235 B2
(45) Date of Patent: Aug. 21, 2018

(54) DEVICE MANAGEMENT APPARATUS, DEVICE MANAGEMENT SYSTEM, AND DEVICE MANAGEMENT METHOD

(71) Applicant: Tomohiro Ikeda, Kanagawa (JP)

(72) Inventor: Tomohiro Ikeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 131 days.

(21) Appl. No.: 15/171,034

(22) Filed: Jun. 2, 2016

(65) Prior Publication Data
US 2016/0357573 A1 Dec. 8, 2016

(30) Foreign Application Priority Data

Jun. 3, 2015 (JP) .................................. 2015-113106

(51) Int. Cl.
*G06F 3/00* (2006.01)
*G06F 9/4401* (2018.01)
*G06F 9/445* (2018.01)

(52) U.S. Cl.
CPC ........ *G06F 9/4411* (2013.01); *G06F 9/44505* (2013.01)

(58) Field of Classification Search
CPC ............................ G06F 9/4411; G06F 9/44505
USPC ............................................................. 710/8
See application file for complete search history.

(56) References Cited

U.S. PATENT DOCUMENTS

| 8,942,933 B2 * | 1/2015 | Murata | G01R 22/10 358/1.13 |
| 2010/0185783 A1 * | 7/2010 | Hamaguchi | H04N 1/00344 710/8 |
| 2010/0321709 A1 * | 12/2010 | Eastman | G06K 9/00442 358/1.9 |
| 2012/0200883 A1 * | 8/2012 | Ikari | G03G 15/5004 358/1.15 |
| 2013/0163037 A1 * | 6/2013 | Huster | G06F 3/1205 358/1.15 |

FOREIGN PATENT DOCUMENTS

JP 2011-008361 1/2011

* cited by examiner

*Primary Examiner* — Chun Kuan Lee
(74) *Attorney, Agent, or Firm* — Cooper & Dunham LLP

(57) ABSTRACT

A device management apparatus includes circuitry configured to execute steps of determining whether a model of a setting subject in which a setting value accepted at first accepting is to be set is a model in which the setting value can be set; if it is determined that the model of the setting subject is a model in which the setting value cannot be set, acquiring a setting value associated with setting value identifying information similar to setting value identifying information input at the first accepting, from a first storage device configured to store a model, a setting value that can be set in the model, and a predetermined setting value identifying information about the setting value in association with one another; and transmitting the setting value acquired at the acquiring to a device of the model in which the setting value cannot be set.

10 Claims, 8 Drawing Sheets

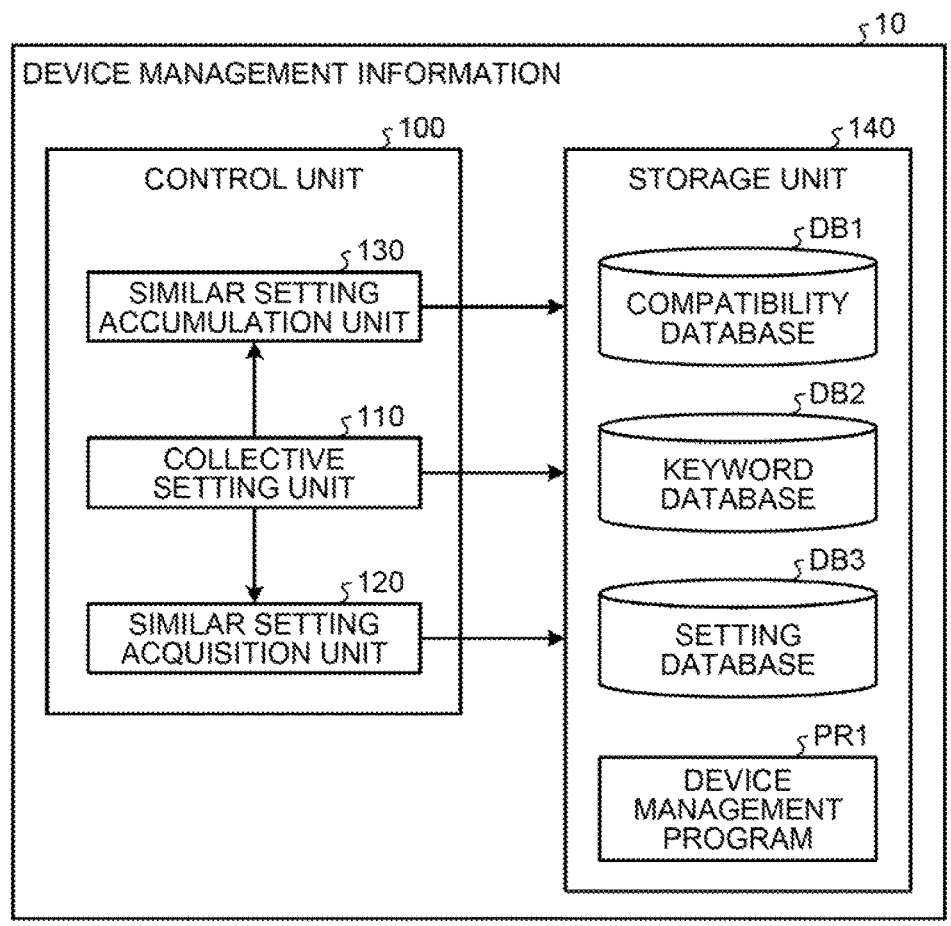

| KEYWORD ID | MODEL IDENTIFYING INFORMATION | KEYWORD | SETTING VALUE |
|---|---|---|---|
| 1 | MP1601 | NormalToner | TONER CONSUMPTION AMOUNT: NORMAL |
| 2 | MP1601 | LowToner | TONER CONSUMPTION AMOUNT: LOW |
| 3 | MP1301 | NormalToner | TONER CONSUMPTION AMOUNT: NORMAL |
| 4 | MP1301 | LowToner | TONER CONSUMPTION AMOUNT: LOW |
| 5 | GX e5500 | HighTonerConsumption | TONER CONSUMPTION AMOUNT: HIGH |
| 6 | GX e5500 | MiddleTonerConsumption | TONER CONSUMPTION AMOUNT: MEDIUM |
| 7 | GX e5500 | LowTonerConsumption | TONER CONSUMPTION AMOUNT: LOW |
| ... | ... | ... | ... |

| DEVICE SETTING ID | DEVICE NUMBER | MODEL IDENTIFYING INFORMATION | SETTING VALUE |
|---|---|---|---|
| 1 | 1111 | MP1601 | TONER CONSUMPTION AMOUNT: NORMAL |
| 3 | 1112 | MP1301 | TONER CONSUMPTION AMOUNT: NORMAL |
| 5 | 1113 | GX e5500 | TONER CONSUMPTION AMOUNT: MEDIUM |
| ... | ... | ... | ... |

DEVICE MANAGEMENT APPARATUS, DEVICE MANAGEMENT SYSTEM, AND DEVICE MANAGEMENT METHOD

CROSS-REFERENCE TO RELATED APPLICATIONS

The present application claims priority under 35 U.S.C. § 119 to Japanese Patent Application No. 2015-113106, filed on Jun. 3, 2015, the contents of which are incorporated herein by reference in their entirety.

BACKGROUND OF THE INVENTION

1. Field of the Invention

The present invention relates to device management apparatuses, device management systems, and device management methods.

2. Description of the Related Art

Conventionally, various multiple models of various devices are set in offices. In order to realize optimum use of such devices, it is necessary to set an optimum setting value in each setting item of each device. For this reason, the device manager who manages the devices has to set each optimum setting value to each device. Accordingly, when there are a large number of devices in which optimum setting values are to be set, the device manager has to set optimum setting values in the large number of devices, which is time-consuming.

SUMMARY OF THE INVENTION

It is an object of the present invention to at least partially solve the problems in the conventional technology.

According to one aspect of the present invention, a device management apparatus includes circuitry. The circuitry is configured to execute steps of first accepting input of a setting value for a device and predetermined setting value identifying information about the setting value, determining whether a model of a setting subject in which the setting value accepted at the accepting is to be set is a model in which the setting value can be set, if it is determined that the model of the setting subject is a model in which the setting value cannot be set, acquiring a setting value associated with setting value identifying information similar to the setting value identifying information input at the first accepting, from a first storage device configured to store a model, a setting value that can be set in the model, and a predetermined setting value identifying information about the setting value in association with one another, and transmitting the setting value acquired at the acquiring to a device of the model in which the setting value cannot be set.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram illustrating an exemplary hardware configuration of a device management apparatus;

FIG. 4 is an explanatory table illustrating an exemplary data structure of a compatible database;

FIG. 5 is an explanatory table illustrating an exemplary data structure of a keyword database;

FIG. 6 is an explanatory table illustrating an exemplary data structure of a setting database;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
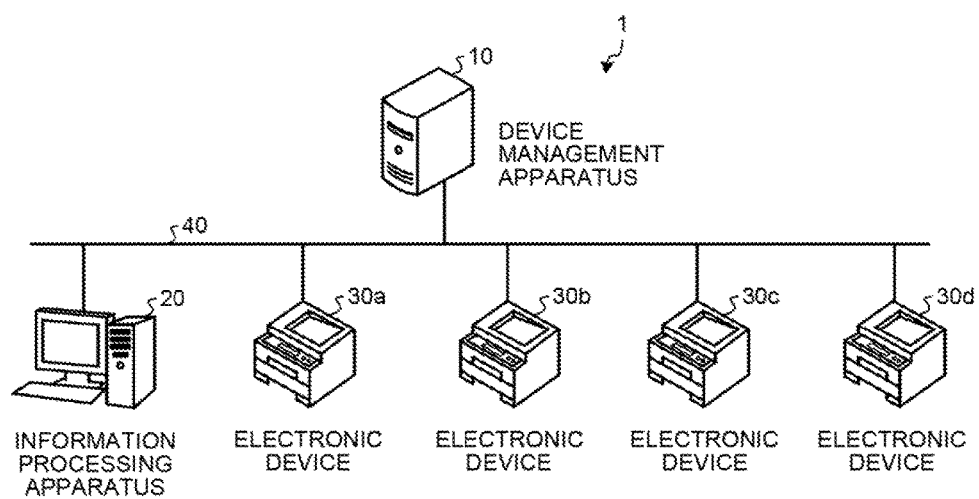
FIG. 1 is an explanatory diagram illustrating an exemplary device management system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

FIG. 1 is an explanatory diagram illustrating an exemplary configuration of a device management system 1 according to an embodiment of the invention. The device management system 1 includes a device management apparatus 10, an information processing apparatus 20, an electronic device 30a, an electronic device 30b, an electronic device 30c, and an electronic device 30d. The device management system 1 includes a network 40, such as a local area network (LAN). The device management apparatus 10, the information processing apparatus 20, the electronic device 30a, the electronic device 30b, the electronic device 30c, and the electronic device 30d communicate via the network 40 according to a protocol, such as TCP/IP (Transmission Control Protocol/Internet Protocol).

The device management apparatus 10 is, for example, a server device that manages the electronic device 30a, the electronic device 30b, the electronic device 30c, and the electronic device 30d of the device management system 1. The device management apparatus 10 receives a setting value for the electronic device 30a, the electronic device 30b, the electronic device 30c, and the electronic device 30d from the information processing apparatus 20. According to the received setting value, the device management apparatus 10 transmits optimum setting values to the electronic device 30a, the electronic device 30b, the electronic device 30c, and the electronic device 30d.

The information processing apparatus 20 is, for example, a personal computer used by a device manager who manages the electronic device 30a, the electronic device 30b, the electronic device 30c, and the electronic device 30d. The information processing apparatus 20 accepts, from the device manager, input of settings for the electronic device 30a, the electronic device 30b, the electronic device 30c, and the electronic device 30d. The information processing apparatus 20 displays the input settings on a display unit. The information processing apparatus 20 transmits the input settings to the device management apparatus 10.

The electronic device 30a, the electronic device 30b, the electronic device 30c, and the electronic device 30d are devices that are managed with respect to setting and the like, by the device management apparatus 10. The electronic device 30a, the electronic device 30b, the electronic device 30c, and the electronic device 30d are of different types of models. The electronic devices 30 set therein the setting values received from the device management apparatus 10. The electronic devices 30 transmit the setting values that are currently set therein to the device management apparatus 10. Each of the electronic device 30a, the electronic device 30b, the electronic device 30c, and the electronic device 30d may be any device, such as a printer, a copier, a scanner device, a facsimile device, a conference terminal, an electronic blackboard, a projector, a fluorescent light, an air conditioner, a camera, a refrigerator, or a vending machine. The electronic device 30a, the electronic device 30b, the electronic device 30c, and the electronic device 30d will be collectively referred to as the electronic devices 30 unless otherwise distinguished. FIG. 1 exemplifies the four electronic devices 30; however, the number of electronic devices 30 of the device management system 1 is not limited to four.

The device management system uses the device management apparatus 10, the information processing apparatus 20, and the electronic devices 30 to execute a collective setting process and a similar setting accumulation process. The collective setting process is a process of setting values collectively in multiple electronic devices 30. In the collective setting process, when an original setting value cannot be set, the device management system 1 sets a similar value instead of the original setting value. Accordingly, even when the multiple electronic devices 30 on which collective setting is to be performed includes a device of a model in which the original setting value cannot be set, the device management system 1 is able to make settings collectively. The similar setting accumulation process is a process of storing, in a database, a setting value that is set when the original setting value cannot be set in the collective setting process.

An overview of the collective setting process will be described here.

Figure 2:
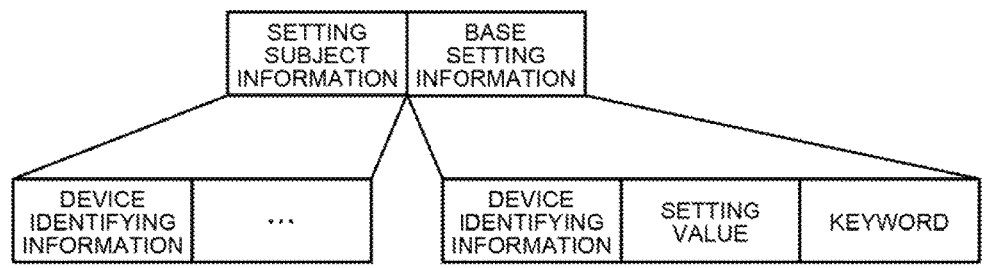
FIG. 2 is an explanatory diagram illustrating an exemplary data structure of collective setting information.

First, the information processing apparatus 20 accepts input of collective setting information from the device manager. FIG. 2 is an explanatory diagram illustrating an exemplary data structure of collective setting information. Specifically, the collective setting information includes setting subject information and base setting information. The setting subject information serving as device identifying information is information representing one or more electronic devices in which the setting value of the base setting information is to be set. In other words, the setting subject information includes device identifying information that can identify multiple electronic devices 30. The setting subject information can specify not only electronic devices 30 of the same model but also electronic devices 30 of multiple models.

The base setting information is information serving as the base of setting values to be set in the multiple electronic devices 30 specified by the setting subject information. The base setting information includes model identifying information, a setting value, and a keyword. The model identifying information is information representing a model in which the setting value in the base setting information can be set. The setting value is the contents of the setting to be made in the electronic device 30 in the setting subject information. The setting value may be other than a number. In other words, as a setting value, on or off may be set or a string or the like may be set. The keyword serving as setting value identifying information is used to acquire a setting value to be set in an electronic device 30 that is specified according to the setting subject information and in which the setting value in the base setting information cannot be set. The keyword may be not only a character but also a number or a symbol. Input of the keyword is optional and the base setting information does not necessarily include a keyword. For example, the keyword is a string, such as "LowToner" and "LowToner" is a keyword that relates to a setting to reduce toner on printing.

The information processing apparatus 20 transmits the collective setting information, which is input, to the device management apparatus 10. The device management apparatus 10 that has received the collective setting information determines whether the setting value in the base setting information can be set in each model of the electronic devices 30 in the device identifying information contained in the setting subject information.

The device management apparatus 10 sets the setting value in the base setting information, in an electronic device(s) 30 of the model in which the setting value in the base setting information can be set. The setting value in the base setting information will be referred to as the base setting value.

When an electronic device 30 of a model in which the base setting value cannot be set is contained in the setting subject information, the device management apparatus 10 determines whether it is possible to acquire a setting value similar to the base setting value. When, regarding the electronic device 30 of the model in which the base setting value cannot be set, a keyword similar to the keyword in the base setting information is stored in the database, the device management apparatus 10 determines that the model is a model for which a setting value similar to the base setting value can be acquired. The device management apparatus 10 then sets an acquired setting value similar to the base setting value in the electronic device 30 of the model for which a setting value similar to the base setting value can be acquired. A setting value similar to the base setting value will be referred to as a similar setting value below.

On the other hand, when the electronic device 30 of a model for which a similar setting value cannot be acquired is contained in the setting subject information, the device management apparatus 10 requires a setting value to be set individually in the electronic device 30 of the model for which a similar setting value cannot be acquired, from the information processing apparatus 20. A setting value to be individually set will be referred to as an individual setting value below.

The information processing apparatus 20 accepts input of an individual setting value to be individually set in the subject electronic device 30 from the device manager. The information processing apparatus 20 transmits the individual setting value to the device management apparatus 10. The device management apparatus 10 then sets the received individual setting value in the electronic device 30 of the model for which a similar setting value cannot be acquired.

Accordingly, even when the electronic devices 30 of multiple types of models includes a device of a model in which the base setting value cannot be set, the device management system 1 sets a similar setting value instead of the base setting value. Accordingly, the device management system 1 is able to collectively set setting values in electronic devices 30 of multiple types of models.

Next, an overview of the similar setting accumulation process will be described.

The device management system 1 accumulates, for each model, a setting value and a predetermined keyword with respect to the setting value in the database. Thereby, the possibility that the device management system 1 acquires similar setting value and performs collective setting can be increased.

Specifically, when the keyword or the setting value of the base setting information is new, the device management apparatus 10 accumulates the keyword and the setting value of the base setting information in the database, or the device management apparatus 10 monitors each electronic device 30 of the device management system 1. Upon detecting a new setting value from an electronic device 30, the device management apparatus 10 requests a keyword from the information processing apparatus 20. The device management apparatus 10 accumulates the new setting value from the electronic device 30 and the keyword received from the information processing apparatus 20, in the database.

In this manner, the device management system 1 accumulates setting values and keywords.

The details of the apparatuses of the device management system 1 will be described below.

First, the device management apparatus 10 will be described.

FIG. 3 is a block diagram illustrating an exemplary hardware configuration of the device management apparatus 10. The device management apparatus 10 includes a control unit 100 having a computer configuration including a CPU, a ROM, and a RAM and a storage unit 140 that is a storage device, such as a hard disk drive (HDD) or a solid state drive (SSD).

The storage unit 140 stores a compatible database DB1, a keyword database DB2, a setting database DB3, and a device management program PR1. The device management program PR1 is a program that implements the characteristic functions of the device management apparatus 10.

The CPU of the control unit 100 loads the device management program PR1 that is stored in the storage unit 140 into the RAM and runs according to the device management program PR1 to generate each of the functional units in the RAM. Specifically, the control unit 100 includes, as the functional units, a collective setting unit 110, a similar setting acquisition unit 120, and a similar setting accumulation unit 130.

The collective setting unit 110 collectively sets a setting value of the collective setting information in the electronic devices 30. The similar setting acquisition unit 120 acquires a similar setting value when a setting checking unit 113, which will be described below, determines that an electronic device 30 in the setting subject information is of a model in which the base setting value cannot be set. The similar setting accumulation unit 130 stores, for each model, a setting value and a keyword in the keyword database DB2 to be described later. Thereby, the possibility that the similar setting accumulation unit 130 acquires a keyword similar to the keyword in the base setting information and performs collective setting can be increased.

The compatibility database DB1 serving as a second storage device is a database that stores compatibility in the setting value between different models. FIG. 4 is an explanatory table illustrating an exemplary data structure of the compatible database DB1. The compatible database DB1 stores a compatibility ID, a setting group, and a model identifying information in association with one another. The compatibility ID is identifying information that can identify association between the setting group and the model identifying information. The setting group is information representing the group of models with compatibility in the setting value. In other words, the setting group is information representing the group of models in which the same setting value can be set. The model identifying information is information representing models that belong to the setting group. Models that belong to the same setting group represent compatibility in the setting value. Regarding the compatibility database DB1 illustrated in FIG. 4, while "MP1601" and "MP1301" have compatibility in the setting value, "GX e5500" does not have any compatibility in the setting value with other models. Examples of combination of incompatible models include a new model and an old model or a laser printer and an inkjet printer.

The keyword database DB2 serving as a first storage device is a database that stores, for each model, a setting value and a predetermined keyword with respect to the setting value in association with each other. FIG. 5 is an explanatory table illustrating an exemplary data structure of the keyword database DB2. The keyword database DB2 stores a keyword ID, model identifying information, a keyword and a setting value in association with one another. Keyword IDs are identifying information that can identify the keywords of various models. The model identifying information is information representing the models in which the setting values corresponding to the keywords are set. The keywords are predetermined information with respect to the setting values with which the keywords are associated. The setting values are information representing the contents of settings that can be made in the associated models. The keyword database DB2 saves the setting values in a XML format, for example. The setting values are for, for example, the amount of toner consumption, image forming fineness, and setting for whether to display the IP address on the display unit, setting for selecting the password policy, setting for the URL (Uniform Resource Locator) of the electronic device 30, and setting for whether to enable the SNTP (Simple Network Time Protocol) server.

The keyword database DB2 illustrated in FIG. 5 represents, as an example, the keywords for the setting values for the amount of toner consumption. Regarding the keyword database DB2 illustrated in FIG. 5, as in the compatibility database DB1 illustrated in FIG. 4, while "MP1601" and "MP1301" have compatibility in the setting value, "GX e5500" does not have any compatibility in the setting value with other models. Specifically, in "MP1601" and "MP1301", the amount of toner consumption can be set at two stages. Meanwhile, in "GX e5500", the amount of toner consummation can be set at three stages. For this reason, the keyword and the setting value of "GX e5500" in the keyword database DB2 illustrated in FIG. 5 are different from other models.

The setting database DB3 serving as a third storage device is a database that stores the setting values that are set in the electronic devices 30 of the device management system 1. FIG. 6 is an explanatory table illustrating an exemplary data structure of the setting database DB3. The setting database DB3 stores a device setting ID, a device number, a model identifying information, and a setting value in association with one another. The device setting IDs are identifying information that can identify the setting values of the electronic devices 30. The device numbers are identifying information that can identify the electronic devices 30. The model identifying information is information representing the models of the electronic device 30. The setting values are information representing the details of the settings made in the electronic devices 30.

Figure 7:
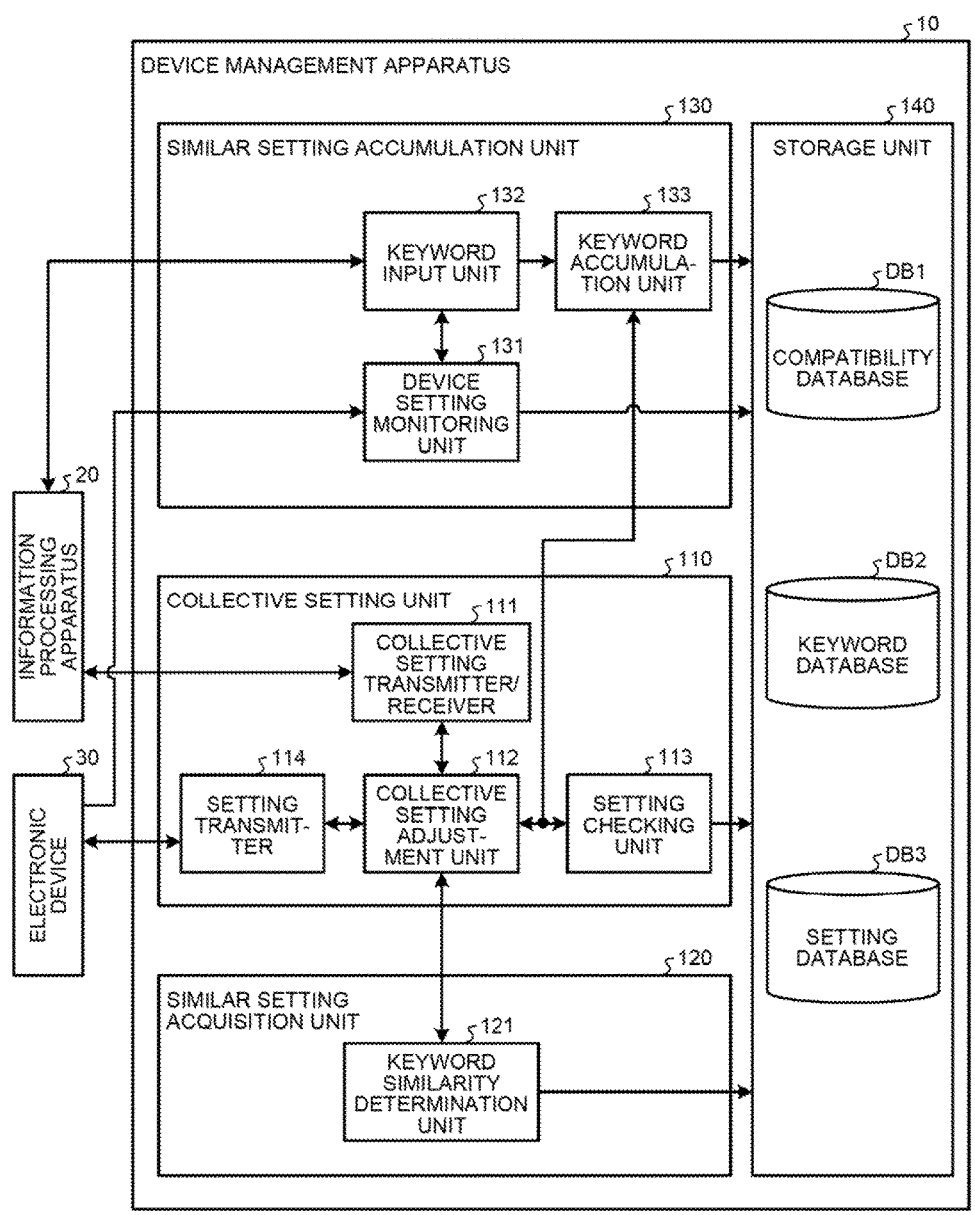
FIG. 7 is a functional block diagram illustrating characteristic functional configurations of each functional unit.

Next, the details of the function of each functional unit (the collective setting unit 110, the similar setting acquisition unit 120, and the similar setting accumulation unit 130) of the device management apparatus 10 will be described. FIG. 7 is a functional block diagram illustrating the characteristic functional configurations of the respective functional units.

First, the collective setting unit 110 will be described. As illustrated in FIG. 7, the collective setting unit 110 includes a collective setting transmitter/receiver 111, a collective setting adjustment unit 112, the setting checking unit 113, and a setting transmitter 114.

The collective setting transmitter/receiver 111 controls communications with the information processing apparatus 20. The collective setting transmitter/receiver 111 receives collective setting information from the information processing apparatus 20. Accordingly, the collective setting transmitter/receiver 111 accepts input of collective setting information. The collective setting transmitter/receiver 111 then transmits the received collective setting information to the collective setting adjustment unit 112.

The collective setting transmitter/receiver 111 serving as a requesting unit requests input of an individual setting value to be set in an electronic device 30 of a model that does not have compatibility with the base setting value and for which it is not possible to acquire a similar setting value, from the information processing apparatus 20. The collective setting transmitter/receiver 111 accepts input of an individual setting value to be individually set in the electronic device 30 of the model that does not have compatibility with the base setting value and for which it is not possible to acquire any similar setting value.

The collective setting adjustment unit 112 adjusts the cooperation between the units of the collective setting unit 110. Specifically, the collective setting adjustment unit 112 transmits the collective setting information to the setting checking unit 113 and causes the setting checking unit 113 to check whether each model of each electronic device 30 contained in the setting subject information has compatibility in the setting value. Furthermore, the collective setting adjustment unit 112 transmits the device identifying information to the similar setting acquisition unit 120 and causes the similar setting acquisition unit 120 to determine whether a similar setting value can be acquired. Upon receiving the fact that the model is a model that does not have compatibility with the base setting value and for which it is not possible to acquire any similar setting value, the collective setting adjustment unit 112 notifies the collective setting transmitter/receiver 111 of the fact that there is no similar setting value. Accordingly, the collective setting transmitter/receiver 111 transmits a request for input of an individual setting value to the information processing apparatus 20. The collective setting adjustment unit 112 then transmits any one of the base setting value, a similar setting value, and an individual setting value to the setting transmitter 114.

The setting checking unit 113 determines whether each model of each setting subject contained in the setting subject information in the collective setting information has compatibility with the base setting value. In other word, the setting checking unit 113 determines whether each of the electronic devices 30 in the setting subject information in the collective setting information is of a model in which the base setting value cannot be set. When the setting group corresponding to the model in the base setting information is identical with the setting group of each model in the setting subject information in the compatibility database DB1, the setting checking unit 113 determines that each model has compatibility with the base setting value. In this case, the setting checking unit 113 determines that the setting value can be set in the electronic devices 30 in the setting subject information. On the other hand, when the setting group corresponding to the model in the base setting information is different from the setting group of a model in the setting subject information in the compatibility database DB1, the setting checking unit 113 determines that the model does not have compatibility with the base setting value. In this case, the setting checking unit 113 determines that the model is a model in which the base setting value cannot be set. The setting checking unit 113 then sends back the determination result to the collective setting adjustment unit 112.

The setting transmitter 114 transmits a setting value to an electronic device 30 managed by the device management apparatus 10. When the base setting value can be set in an electronic device 30 that is a setting subject, the setting transmitter 114 transmits the setting value in the base setting information to the electronic device 30. When the base setting value cannot be set in an electronic device 30 that is a setting subject and a similar setting value is acquired, the setting transmitter 114 serving as a transmission unit transmits the similar setting value to the electronic device 30. When no similar setting value can be acquired, the setting transmitter 114 transmits an individual setting value whose input is accepted by the collective setting transmitter/receiver, to the electronic device 30.

Next, the similar setting acquisition unit 120 will be described. As illustrated in FIG. 7, the similar setting acquisition unit 120 includes a keyword similarity determination unit 121. The keyword similarity determination unit 121 extracts, from the keyword database DB2, the keyword and the setting value that are associated with the model of an electronic device 30 contained in the setting subject information. The keyword similarity determination unit 121 serving as an acquisition unit acquires a setting value associated with a keyword similar to the keyword in the collective setting information, from the keyword and the setting value that are acquired from the keyword database DB2. The similar setting acquisition unit 120 transmits the acquired setting value to the collective setting unit 110. When the keyword similarity determination unit 121 cannot acquire any setting value associated with a keyword similar to the keyword in the collective setting information, the keyword similarity determination unit 121 transmits the fact that such a setting value cannot be acquired to the collective setting unit 110.

When the entire keyword in the collective setting information is contained in a keyword stored in the keyword database DB2, the keyword similarity determination unit 121 determines that the keywords are similar to each other. The idea of similarity includes the idea of identicalness. Specifically, when the keyword in the collective setting information is "AAA", the keywords "BAAA", "CAAAD" and "EAAA" all contain the keyword "AAA" in the collective setting information and therefore are similar to the keyword "AAA". On the other hand, any of the keywords "AA", "BAA" and "AACD" do not contain the keyword "AAA" in the collective setting information and therefore are not similar to the keyword "AAA".

Regarding the keywords illustrated in FIG. 5, when the keyword in the collective setting information is "LowToner", the keyword similarity determination unit 121 determines that the keyword is similar to "LowTonerConsumption". When the keyword in the collective setting information is "NormalToner", the keyword similarity determination unit 121 determines that the keyword is not similar to any keyword.

Next, the similar setting accumulation unit 130 will be described. As illustrated in FIG. 7, the similar setting accumulation unit 130 includes a device setting monitoring unit 131, a keyword input unit 132, and a keyword accumulation unit 133.

The device setting monitoring unit 131 monitors whether a new setting value is set as the setting value set in an electronic device 30. Specifically, the device setting monitoring unit 131 acquires the setting value that is set in an electronic device 30. The device setting monitoring unit 131 also acquires the setting values of the respective electronic devices 30 that are stored in the setting database DB3. The device setting monitoring unit 131 serving as a detection unit then detects that a new setting value is set. Specifically, when the setting value acquired from an electronic device 30 is not contained in the setting values acquired from the setting database DB3, the device setting monitoring unit 131 determines that the setting value is a new setting value.

When the device setting monitoring unit 131 detects that a new setting value is set, the keyword input unit 132 requests a keyword to be associated with the detected new setting value, from the information processing apparatus 20. The keyword input unit 132 accepts input of a predetermined keyword with respect to the new setting value from the information processing apparatus 20.

The keyword accumulation unit 133 serving as a storage control unit stores a keyword, a setting value, and model identifying information about a setting subject in association with one another in the keyword database DB2. When the collective setting unit 110 sets the setting value corresponding to the new keyword in an electronic device 30, the keyword accumulation unit 133 stores the keyword, the setting value and the model identifying information about the setting subject in the keyword database DB2. Specifically, when the collective setting unit 110 sets the setting value in the electronic device 30, the keyword accumulation unit 133 receives the model identifying information about the electronic device 30, the set setting value, and a predetermined keyword with respect to the setting value from the collective setting unit 110.

The keyword accumulation unit 133 determines whether the model identifying information and the keyword received from the collective setting unit 110 are stored in association with each other in the keyword database DB2. When the model identifying information and the keyword are not stored in association with each other in the keyword database DB2, the keyword accumulation unit 133 stores the model identifying information, the keyword, and the setting value received from the collective setting unit 110 in association with one another.

When the device setting monitoring unit 131 detects a new setting value from an electronic device 30, the keyword accumulation unit 133 stores a keyword, the setting value, and model identifying information about the setting subject in the keyword database DB2. Specifically, the keyword accumulation unit 133 stores a keyword whose input is accepted by the keyword input unit 132, the new setting value detected by the device setting monitoring unit 131, and the model identifying information about the electronic device 30 in which detection is made by the device setting monitoring unit 131 in association with one another in the keyword database DB2.

Next, the information processing apparatus 20 will be described.

Figure 8:
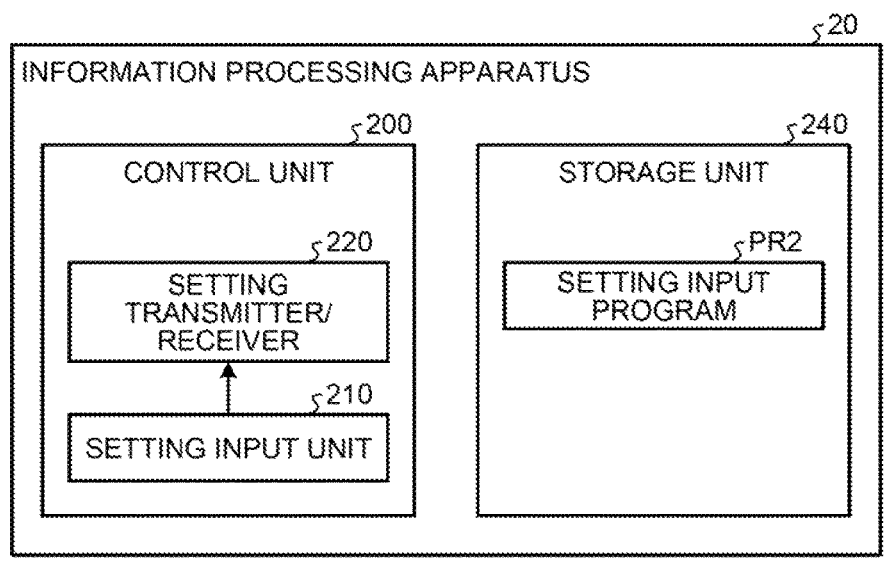
FIG. 8 is a functional block diagram illustrating a characteristic functional configuration of an information processing apparatus.

FIG. 8 is a functional block diagram illustrating a characteristic functional configuration of the information processing apparatus 20. The information processing apparatus 20 includes a control unit 200 that has a computer configuration including a CPU, a ROM, and a RAM; and a storage unit 240 serving as a storage device, such as a HDD or SSD. The information processing apparatus 20 includes a display device, such as a display, and an input device, such as a keyboard and a mouse, i.e., has a hardware configuration using a general-purpose computer. The storage unit 240 stores a setting input program PR2. The setting input program PR2 is a program that implements the characteristic functions of the information processing apparatus 20.

The CPU of the control unit 200 loads the setting input program PR2 stored in the storage unit 240 into the RAM and runs according to the setting input program PR2 to generate each of the functional units in the RAM. Specifically, the control unit 200 includes, as the functional units, a setting input unit 210 and a setting transmitter/receiver 220.

The setting input unit 210 accepts input from the device manager who operates the information processing apparatus 20. The setting input unit 210 accepts input of collective setting information from the device manager. The setting input unit 210 may accepts input using a graphical user interface (GUI) or a character user interface (CUI).

The setting transmitter/receiver 220 controls transmission/reception of data to/from the device management apparatus 10 via the network 40. When the setting input unit 210 accepts input, the setting transmitter/receiver 220 transmits the collective setting information to the device management apparatus 10. In other words, the setting transmitter/receiver 220 serving as an output unit outputs a base setting value to be collectively set in multiple electronic devices 30, a predetermined keyword with respect to the base setting value, and device identifying information representing electronic devices 30 in which the base setting value is to be set, to the device management apparatus 10, or the setting transmitter/receiver 220 receives a request for input of a keyword. The setting transmitter/receiver 220 then transmits a keyword as a response to the input request.

Next, the electronic device 30 will be described.

Figure 9:
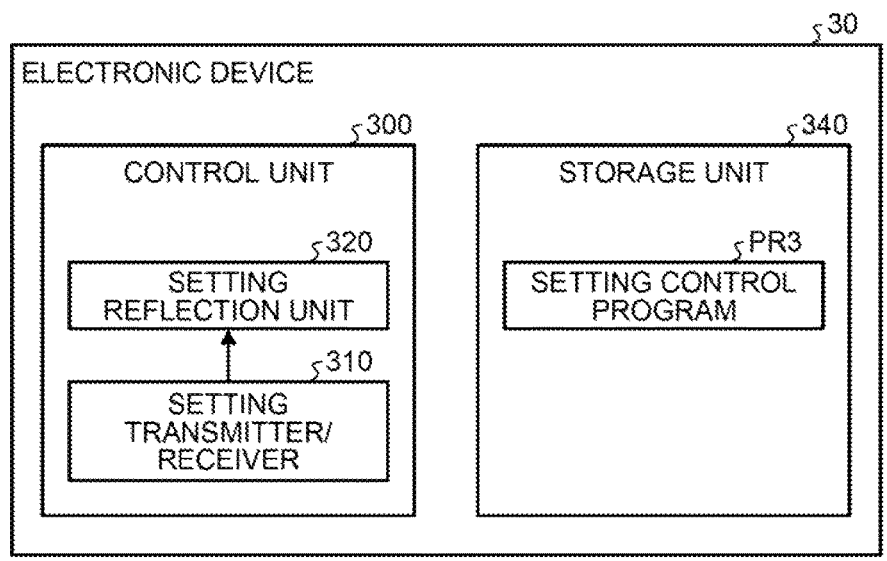
FIG. 9 is a functional block diagram illustrating a characteristic functional configuration of an electronic device.

FIG. 9 is a functional block diagram illustrating a characteristic functional configuration of the electronic device 30. The electronic device 30 includes a control unit 300 that has a computer configuration including a CPU, a ROM and a RAM; and a storage unit 340 serving as a storage device, such as a HDD or a SDD. The storage unit 340 stores a setting control program PR3. The setting control program PR3 is a program that implements characteristic functions of the electronic device 30.

The CPU of the control unit 300 loads the setting control program PR3 stored in the storage unit 340 into the RAM and runs according to the setting control program PR3 to generate the functions of the electronic device 30 in the RAM. Specifically, the control unit 300 includes, as the functional units, a setting transmitter/receiver 310 and a setting reflection unit 320.

The setting transmitter/receiver 310 receives a setting value from the device management apparatus 10 via the network 40, or the setting transmitter/receiver 310 transmits the setting value that is set in the electronic device 30 to the device management apparatus 10 via the network 40.

When the setting transmitter/receiver 310 receives a setting value, the setting reflection unit 320 serving as a setting unit sets the received setting value in the electronic device 30.

Figure 10:
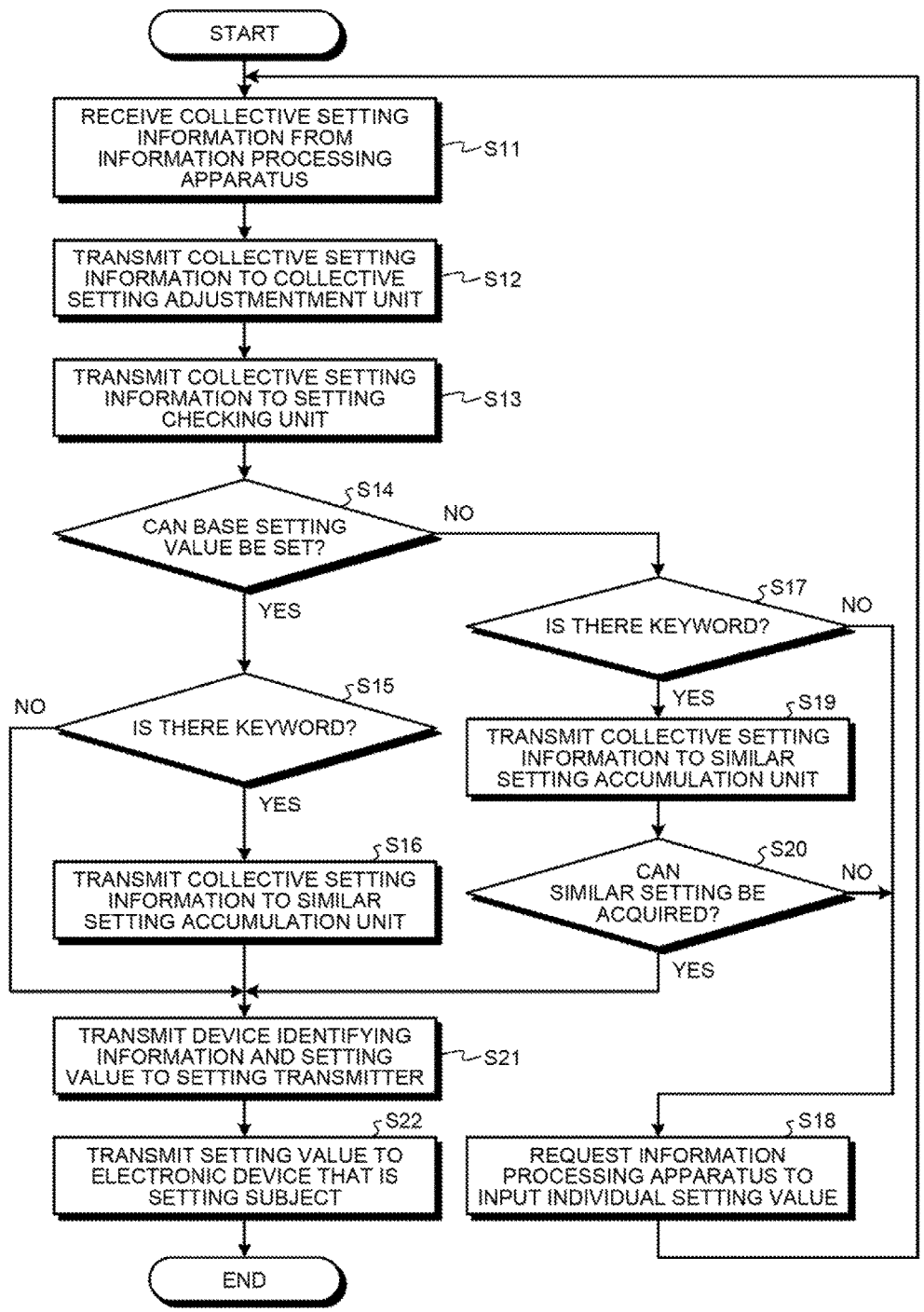
FIG. 10 is a flowchart illustrating an exemplary collective setting process.

Next, the collective setting process executed by the setting checking unit 113 will be described. FIG. 10 is a flowchart of an exemplary collective setting process executed by the collective setting unit 110 according to the embodiment.

First, the collective setting transmitter/receiver 111 receives collective setting information from the information processing apparatus 20 (step S11).

The collective setting transmitter/receiver 111 then transmits the received collective setting information to the collective setting adjustment unit 112 (step S12).

The collective setting adjustment unit 112 then transmits the collective setting information to the setting checking unit 113 (step S13).

The setting checking unit 113 then determines whether the base setting value can be set in each of the models contained in the setting subject information in the collective setting information received from the collective setting adjustment unit 112 (step S14). When the base setting value can be set in each of the models in the setting subject information (YES at step S14), the collective setting adjustment unit 112 determines whether the base setting information includes a keyword (step S15)

When the base setting information includes a keyword (YES at step S15), the collective setting adjustment unit 112 transmits the base setting information to the similar setting accumulation unit 130 (step S16). Accordingly, the similar setting accumulation unit 130 executes a similar setting accumulation process, which will be described later.

On the other hand, when the base setting information does not include any keyword (NO at step S15), the collective setting adjustment unit 112 goes to step S21.

When the base setting value cannot be set in each of the models in the setting subject information (NO at step S14), the collective setting adjustment unit 112 determines whether the base setting information includes a keyword (step S17).

When the base setting information does not include any keyword (NO at step S17), the collective setting adjustment unit 112 transmits notification that requests input of an individual setting value to be individually set in the electronic device 30 from the information processing apparatus 20, to the collective setting transmitter/receiver 111 (step S18). Alternatively, the collective setting adjustment unit 112 may request input of a keyword. In this case, the collective setting unit 110 can set a similar setting value acquired from the keyword. The collective setting adjustment unit 112 then goes to step S11.

When the base setting information includes a keyword (YES at step S17), the collective setting adjustment unit 112 transmits the collective setting information to the similar setting accumulation unit 130 (step S19). Accordingly, the similar setting accumulation unit 130 executes the similar setting accumulation process, which will be described below.

The similar setting accumulation unit 130 then determines whether a similar setting value can be acquired (step S20). When no similar setting value can be acquired (NO at step S20), the similar setting accumulation unit 130 goes to step S18.

On the other hand, when a similar setting value can be acquired (YES at step S20), the collective setting adjustment unit 112 goes to step S21. The collective setting adjustment unit 112 transmits the device identifying information about the setting subject and the setting value in association with each other to the setting transmitter 114 (step S21).

The setting transmitter 114 then transmits the associated setting value to the electronic device 30 in the device identifying information about the setting subject (step S22).

In this manner, the collective setting unit 110 executes the collective setting process.

Figure 11:
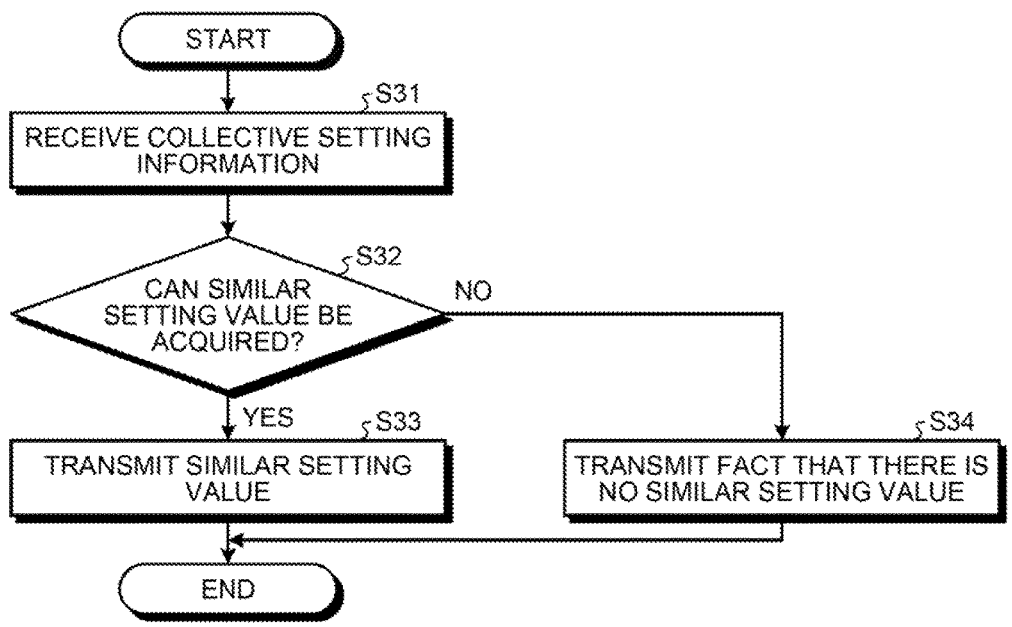
FIG. 11 is a flowchart illustrating an exemplary similar setting acquisition process.

Next, the similar setting acquisition process executed by the similar setting acquisition unit 120 according to the embodiment will be described. FIG. 11 is a flowchart of an exemplary similar setting acquisition process executed by the similar setting acquisition unit 120.

First, the keyword similarity determination unit 121 receives collective setting information from the collective setting unit 110 (step S31).

The keyword similarity determination unit 121 determines whether a similar setting value can be acquired from the keyword database DB2 (step S32).

When a similar setting value can be acquired from the keyword database DB2 (YES at step S32), the keyword similarity determination unit 121 transmits a similar setting value to the collective setting unit 110 (step S33).

When no similar setting value can be acquired from the keyword database DB2 (NO at step S32), the keyword similarity determination unit 121 transmits the fact that there is no similar setting value to the collective setting unit 110 (step S34).

Then, the similar setting acquisition unit 120 ends the similar setting acquisition process.

Figure 12:
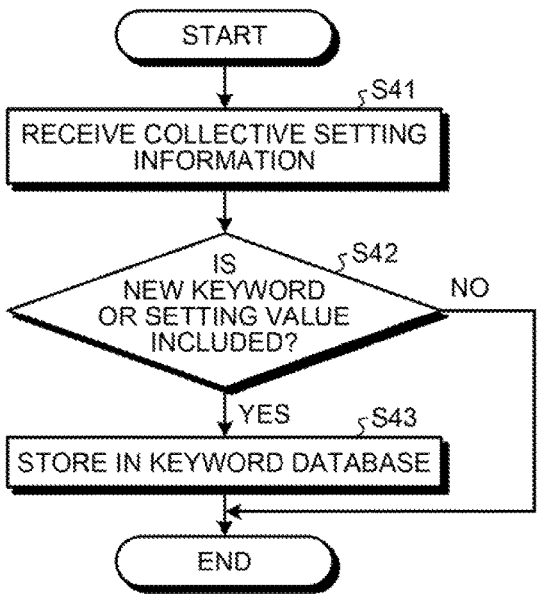
FIG. 12 is a flowchart illustrating an exemplary similar setting accumulation process.

Next, the similar setting accumulation process executed by the similar setting accumulation unit 130 according to the embodiment will be described. FIG. 12 is a flowchart of an exemplary similar setting accumulation process executed by the similar setting accumulation unit 130 according to the embodiment.

The keyword accumulation unit 133 receives the collective setting information from the collective setting unit 110 (step S41).

The keyword accumulation unit 133 determines whether, regarding the model in the model identifying information in the received collective setting information, the keyword or the setting value in the base setting information is a new keyword or setting value that is not stored in the keyword database DB2 (step S42).

When the keyword or the setting value is a new keyword or setting value that is not stored in the keyword database DB2 (YES at step S42), the keyword accumulation unit 133 stores, in the keyword database DB2, the setting value and the keyword in association with the model identifying information in the base setting information in the received collective setting information (step S43).

On the other hand, when the keyword or setting value is an existing keyword or setting value that is stored in the keyword database DB2 (NO at step S42), the keyword accumulation unit 133 does not perform any special processing.

Then, the similar setting accumulation unit 130 ends the similar setting accumulation process.

Figure 13:
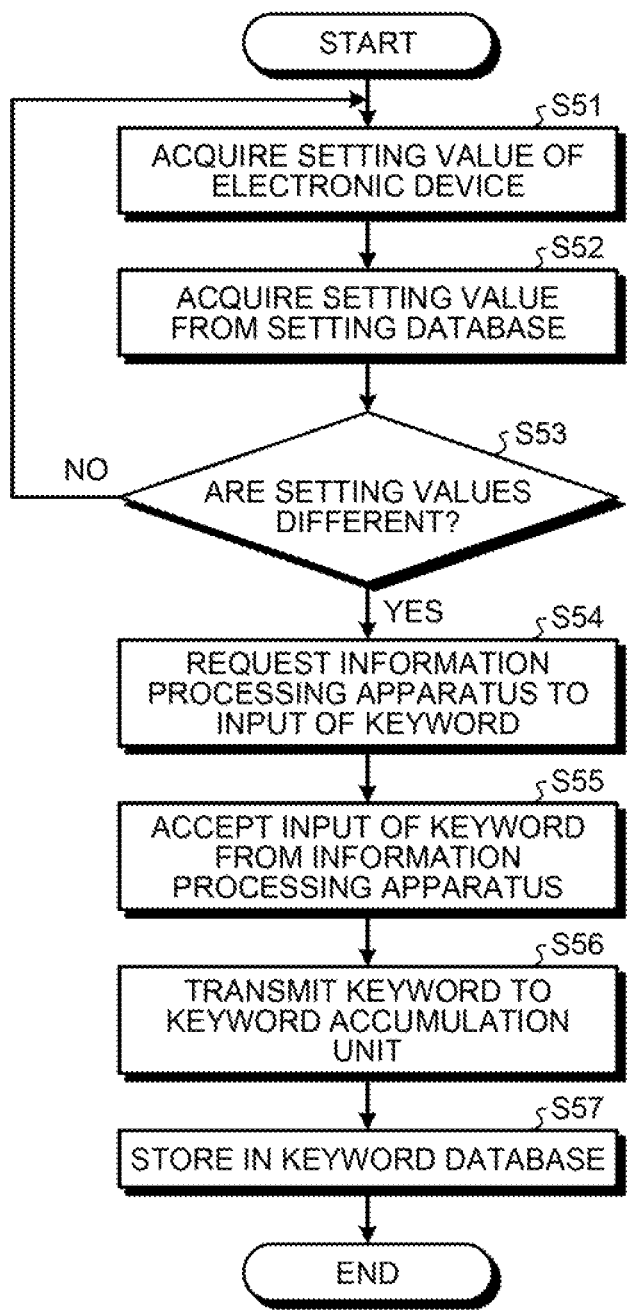
FIG. 13 is a flowchart illustrating an exemplary similar setting accumulation process.

The similar setting accumulation process is not limited to accumulation of the setting value in the base setting information in the collective setting information received from the collective setting unit 110 and a setting value acquired from an electronic device 30 may be stored in the keyword database DB2. FIG. 13 is a flowchart of an exemplary similar setting accumulation process executed by the similar setting accumulation unit 130 according to the embodiment.

First, the device setting monitoring unit 131 acquires a setting value that is set in an electronic device 30 from the electronic device 30 (step S51).

The device setting monitoring unit 131 acquires the setting value that is set in the electronic device 30 and stored in the setting database DB3 (step S52).

The device setting monitoring unit 131 then determines whether a setting value different from the setting value acquired from the setting database DB3 is set in the electronic device 30 (step S53).

When the setting value acquired from the electronic device 30 and the setting value acquired from the setting database DB3 are identical (NO at step S53), the device setting monitoring unit 131 goes to step S51.

On the other hand, when a setting value different from the setting value acquired from the setting database DB3 is set in the electronic device 30 (YES at step S53), the keyword input unit 132 requests input of a keyword to be associated with the different setting value from the information processing apparatus (step S54).

The keyword input unit 32 then accepts input of a keyword from the information processing apparatus 20 (step S55).

The keyword input unit 132 then transmits the input keyword to the keyword accumulation unit 133 (step S56).

The keyword accumulation unit 133 then stores the input keyword, the setting value acquired from the electronic device 30, and the model of the electronic device 30 from which the setting value is acquired in association with one another in the keyword database DB2 (step S57).

Then, the similar setting accumulation unit 130 ends the similar setting accumulation process.

As described above, according to the device management system 1 according to the embodiment, the device management apparatus 10 accepts input of electronic devices 30 that are setting subjects, a setting value for the electronic devices 30, and a predetermined keyword with respect to the setting value via the information processing apparatus 20. The setting checking unit 113 of the device management apparatus 10 checks whether each of the input multiple electronic devices 30 that are the setting subjects is of a model in which the input setting value cannot be set. When a device is of a model in which the input setting value cannot be set, the similar setting acquisition unit 120 acquires, regarding the model in which the input setting value cannot be set, the setting value associated with a keyword similar to the input keyword from the keyword database DB2. The setting transmitter 114 of the device management apparatus 10 transmits the acquired setting value to the electronic device 30 on which collective setting cannot be performed. Accordingly, even when an electronic device 30 of an incompatible model on which collective setting cannot be performed is contained in the setting subjects, it is possible to set optimum setting values collectively regardless of presence of compatibility.

The embodiment described above does not limit the scope of the invention. The information processing apparatus 20 may have each function of the device management apparatus 10 and each database. Furthermore, the device management apparatus 10 may have each function of the information processing apparatus 20. Furthermore, the device management apparatus 10 may consist of multiple server devices and any server device may have any of functions and databases.

The system configuration according to the embodiment in which the device management apparatus 10, the information processing apparatus 20, and the electronic devices 30 are connected to one another is an example only. Needless to say, there are various exemplary system configurations according to the use and purposes.

The program to be executed by each of the devices of the embodiment and modifications is provided in a manner that the program is previously incorporated in the storage medium (ROM or storage unit) of each device; however, the program is not limited to this configuration. For example, the program may be configured to be provided in a manner that the program is recorded in a computer-readable recording medium, such as a CD-ROM, flexile disk (FD), a CD-R, or a digital versatile disk (DVD), in a file in an installable or executable form. Furthermore, the storage medium is not limited to a medium independent of the computer or an incorporated system and includes a storage medium that stores or temporarily stores the program that is transmitted via a LAN or the Internet and downloaded.

The program to be executed by each of the devices of the embodiment or modifications may be configured to be provided in a manner that the program is stored in a computer connected to a network, such as the Internet, for downloading via the network, or provided or distributed via a network, such as the Internet.

The program of each device of the embodiment may be configured to be provided in a manner that the program is previously incorporated in, for example, a ROM.

According to an embodiment, an effect that, even when an original setting cannot be made, collective setting can be performed on multiple devices is achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device management apparatus comprising circuitry configured to execute steps of:
    first accepting input of an initial setting value for a device and an initial predetermined setting value identifying information about the initial setting value;
    determining whether a received model of a setting subject in which the initial setting value accepted at the first accepting is to be set is one that the initial setting value can be set;
    when it is determined that the received model of the setting subject is one that the initial setting value cannot be set, acquiring a similar setting value associated with a stored setting value identifying information similar to the predetermined setting value identifying information input at the first accepting, from a first storage device configured to store a stored model, a stored setting value that can be set in the stored model, and stored predetermined setting value identifying information about the stored setting value in association with one another; and
    transmitting the similar setting value acquired at the acquiring to the device of the received model in which the initial setting value cannot be set.

2. The device management apparatus according to claim 1, wherein, the circuitry is configured to, if the setting value identifying information that is input at the first accepting is contained in the setting value identifying information stored in the first storage device, determine that the setting value identifying information that is input at the first accepting is similar to the setting value identifying information that is stored in the first storage device.

3. The device management apparatus according to claim 1, wherein, the circuitry is configured to, if a second storage device configured to store a model having compatibility with a setting value stores a fact that a model of a setting subject does not have compatibility with a setting value, determine that the model is a model in which the setting value cannot be set.

4. The device management apparatus according to claim 1, wherein the circuitry is configured to further execute a step of, if the setting value cannot be acquired at the acquiring, requesting input of a setting value to be individually set in the device of the model in which the setting value cannot be set.

5. The device management apparatus according to claim 4, wherein the circuitry is configured to further execute steps of:
    second accepting input of the setting value that is requested at the requesting and is to be individually set, and
    transmitting the setting value whose input is accepted at the second accepting and that is to be individually set, to the device of the model in which the setting value cannot be set.

6. The device management apparatus according to claim 1, wherein the circuitry is configured to further execute a step of storing the setting value and the setting identifying information input at the first accepting, and the model of the setting subject in which the setting value is to be set in association with one another in the first storage device.

7. The device management apparatus according to claim 1, wherein the circuitry is configured to further execute steps of:
    detecting that a new setting value is set in a device; and
    if it is detected that the new setting value is set, third accepting input of predetermined setting value identifying information about the new setting value, and
    storing the setting identifying information input at the third accepting, the setting value detected at the detecting, and a model of the device in which it is detected that the new setting value is set, in association with each other in the first storage device.

8. The device management apparatus according to claim 7, wherein, the circuitry is configured to, if a third storage device configured to store, for each device, a setting value that is set in the device does not contain a setting value acquired from the device, determine that the setting value is the new setting value.

9. A device management system comprising:
    an information processing apparatus including circuitry configured to execute a step of outputting an initial setting value to be set collectively in a plurality of devices, predetermined setting value identifying information about the initial setting value, and device identifying information representing the devices in which the initial setting value is to be set;
    a device management apparatus including circuitry configured to execute steps of:
    accept inputting of the initial setting value for a device, the predetermined setting value identifying information about the initial setting value, and the device identifying information representing the plurality of devices in which the initial setting value is to be set;
    determining whether each of the plurality of devices represented by the device identifying information accepted at the first accepting is of a received model in which the initial setting value can be set;
    when it is determine that the device is of the received model in which the initial setting value cannot be set, acquiring a similar setting value that is associated with a stored setting value identifying information similar to the predetermined setting value identifying information that is input at the accepting, from a first storage device configured to store a stored model, a stored setting value that can be set in the stored model, and the stored predetermined setting value identifying information about the stored setting value in association with one another; and transmitting the similar setting value acquired at the acquiring to the device of the received model in which the initial setting value cannot be set; and devices each including circuitry configured to perform a step of setting the initial setting value that is transmitted at the transmitting.

10. A device management method executed by circuitry, comprising steps of:

accepting, input of an initial setting value for a device and predetermined setting value identifying information about the initial setting value;

determining whether a received model of a setting subject in which the initial setting value accepted at the first accepting is to be set is one that the initial setting value can be set, when it is determined that the received model of the initial setting subject is one that the initial setting value cannot be set, acquiring a similar setting value associated with a stored setting value identifying information similar to the predetermined setting value identifying information input at the step of accepting, from a first storage device configured to store a stored model, a stored setting value that can be set in the received model, and the stored predetermined setting value identifying information about the stored setting value in association with one another; and transmitting the similar setting value acquired at the step of acquiring to the device of the received model in which the initial setting value cannot be set.

* * * * *